United States Patent [19]

Ravenshorst et al.

[11] Patent Number: 5,655,296
[45] Date of Patent: Aug. 12, 1997

[54] METHOD OF MANUFACTURING CONNECTING RODS

[75] Inventors: Henk Ravenshorst, Västra Frölunda; Jörgen König, Edane, both of Sweden

[73] Assignees: AB Volvo, Gothenburg; Ovako Arvika AB, Arvika, both of Sweden

[21] Appl. No.: 448,522

[22] PCT Filed: Dec. 30, 1993

[86] PCT No.: PCT/SE93/01114

§ 371 Date: Jun. 14, 1995

§ 102(e) Date: Jun. 14, 1995

[87] PCT Pub. No.: WO94/15737

PCT Pub. Date: Jul. 21, 1994

[30] Foreign Application Priority Data

Dec. 30, 1992 [SE] Sweden ................. 9203941-1

[51] Int. Cl.$^6$ ....................................... B23P 15/00
[52] U.S. Cl. ........................ 29/888.092; 24/413
[58] Field of Search ................. 29/888.09, 888.092, 29/413; 74/579 E; 225/12

[56] References Cited

U.S. PATENT DOCUMENTS

| 1,791,187 | 2/1931 | Brauchler | 29/888.092 |
| 2,502,737 | 4/1950 | Meley et al. | 29/888.092 |
| 2,553,935 | 5/1951 | Parks et al. | |
| 4,693,139 | 9/1987 | Mukai et al. | |
| 4,936,163 | 6/1990 | Hoag et al. | 29/888.09 |
| 5,051,232 | 9/1991 | Summers. | |
| 5,105,538 | 4/1992 | Hoag et al. | 29/888.09 |

FOREIGN PATENT DOCUMENTS

| 0 507 519 | 10/1992 | European Pat. Off. . | |
| 1731567 | 5/1992 | U.S.S.R. | 29/888.09 |

Primary Examiner—Irene Cuda
Attorney, Agent, or Firm—Young & Thompson

[57] ABSTRACT

Method of manufacturing, in one piece, forged connecting rods. The method includes cutting blanks from a bar. Each blank is worked in several steps, until it assumes its final shape. During the various working steps, a groove made in each blank is caused to spread out in a predetermined manner and finally forms a fracture initiation (44), in the area (38) through which bolt holes are drilled for the bearing cap mounting bolts. After final working, the remaining portions of the core portion (10, 46, 50) are divided by a slight separating force, thus providing in the fracture surface the required guidance for remounting the bearing cup on the upper bearing.

9 Claims, 3 Drawing Sheets

METHOD OF MANUFACTURING CONNECTING RODS

FIELD OF THE INVENTION

The present invention relates to a method of manufacturing connecting rods, forged in one piece, each connecting rod having a big-end, comprising an upper bearing and a bearing cap, and a small-end, said ends being joined to each other by a connecting rod arm. The method comprises: cutting, from a bar, blanks of a cross-sectional area and length appropriate to each connecting rod; preheating the blanks; forging out each blank and dividing the connecting rod forged in one piece into two parts along a predetermined dividing plane through the big-end of the connecting rod.

BACKGROUND OF THE INVENTION

According to a previously known method, the big-end is divided into an upper bearing and a bearing cap, which are reconnected by means of bolts, when the complete engine is assembled. The division can be effected in different ways, e.g. by milling apart which is, however, both labour and material consuming, since the connecting rod must be over-dimensioned due to the material which is milled off. This in turn requires that the crankshaft hole in the big-end first be drilled in circular shape and then be worked to an oval and that the milling off of material during division be so exact that the crankshaft hole, when the parts are re-assembled, will again assume a circular shape fitting the crankshaft. In order to make possible re-assembly of the bearing cap and the upper bearing with exact fit, the separate parts must also be specially worked. The working is, as a rule, carried out by deep grinding or serration grinding and cutting grooves, i.e. alternating ridges and grooves are made in the facing surfaces of the upper bearing and the bearing cap to provide the required guidance for correct assembly of the parts.

Another known process means that the bearing cap is separated from the big-end of the connecting rod by buckling. In order to avoid deformation of the material adjacent the dividing plane, it must, as a rule, be pretreated prior to the buckling blow itself. The pretreatment is intended to alter the properties of the material surrounding the plane of division, to increase its brittleness, which is advantageous to the buckling step. One method of treatment involves an electrolytic process, by means of which hydrogen is caused to diffuse into the metal along the intended plane of division, whereafter a sufficiently heavy blow or other force produces a fracture without deformation. Another method involves increasing the brittleness of the material in the area in question by means of induction hardening. To be sure, by means of this process, the buckling plane through the remaining material in the upper bearing and the bearing cap will form after buckling opposing irregularly profiled surfaces which have varying profile depths depending on the hardness of the material. The projections and indentations in the profile surfaces guide the upper bearing and the bearing cap into exact alignment with each other.

However, this division according to known methods is complicated and requires special tools for execution, and therefore it is desirable that at least some treatment or working step can be simplified or eliminated. The operations in question include draw reaming of bearing caps, separation by sawing, serration grinding, disassembly, washing and re-assembly of each connecting rod and finishing of the crankshaft hole and buckling in a special buckling machine. A reduction in the number of operations can also make it possible to reduce the number of operators.

The purpose of the invention is therefore to improve known methods of manufacturing connecting rods by a method which is simple, inexpensive and can be carried out with high precision.

SUMMARY OF THE INVENTION

The purpose is achieved according to the invention by virtue of the fact that the division of the finished connecting rod is initiated before the beginning of the forging operations by a groove being made by cutting into the lateral surface of each blank, that the groove is disposed at a predetermined distance from the end of the blank which is to form the big-end and has a predetermined shape, that the groove in each blank is coated with a substance which prevents formation of oxides and mill scales before the blanks are heated to forging temperature and that the groove during the various forging steps is caused to expand in a predetermined manner to finally form, in the dividing plane, a fracture initiation about a remaining homogeneous portion of the big-end, which is located in the area within which bolt holes for fastening bolts of the bearing cap are drilled.

According to a preferred embodiment, the bearing cap is separated from the upper bearing by the bolt holes required for remounting of the bearing cap on the upper bearing being drilled through at least a major portion of the homogeneous portion surrounded by the fracture initiation, whereupon any remaining material in the dividing plane is broken off by a slight separating force.

According to a particularly advantageous example, the cross-sectional area of the remaining material in the homogeneous portion, after hole drilling, is less than 5% of the dividing area between the connecting rod portion and the bearing cap portion. This makes for a deformation free dividing surface, which provides reliable guidance between the connecting rod portion and the bearing cap portion.

In order to prevent the formation of oxides and mill scales in the radial annular groove in each blank, and to achieve a brittle dividing surface (after forging), it has proved effective to coat the groove with graphite or a ceramic material before preheating the blanks. A suitable ceramic material is feldspar glaze.

BRIEF DESCRIPTION OF THE DRAWINGS

The invention will be described in more detail below with reference to the accompanying schematic drawings.

DETAILED DESCRIPTION OF THE INVENTION

Figure 1:
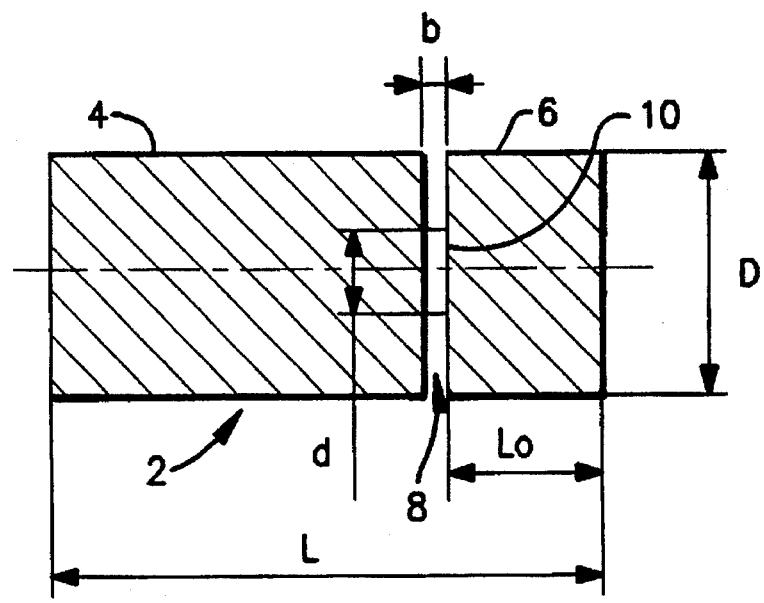
FIG. 1 shows a blank cut from a bar and provided with an annular groove.

The method of manufacture is initiated by clipping or sawing a bar material in cold state into lengths or blanks to an appropriate length. The diameter of the bar D and thus the diameter of the blanks or lengths varies depending on what type of connecting rod is to be manufactured. Blanks of both circular and rectangular or square cross-section can be used in the invention. Suitable diameters lie within the interval 43–65 mm. The length of the blank L also varies, depending on the type of connecting rod, and suitable values of L lie in the interval 125–400 mm. Suitable types of materials for the purpose are steel or lightweight metals, preferably precipitation hardenable steel, but the forging method is applicable to all types of materials, e.g. alloys of aluminium or titanium, and powder materials.

Each blank 2 is divided into a connecting rod portion 4 and a bearing cap portion 6 by means of a transverse annular groove 8, which is cut radially into the cylindrical lateral surface of the blank. The bottom of the annular groove defines a circular homogeneous core portion 10, the diameter d of which varies as a function of the values of D, and can assume values in the interval 10–30 mm. The groove 8 in the blank is located so that a fracture indication is obtained in the separation plane between the connecting rod portion and the bearing cap portion. Suitable distances $L\ddot{o}$ from the end of the blank to the groove vary depending on what type of connecting rod is to be manufactured. Tests have shown that a suitable value for $L\ddot{o}$ is 40–50 mm. Depending on what technique is used in making the groove, it is possible to allow the width b of the groove to vary from a few hundreds of a millimeter up to 5 mm. A particularly suitable groove width has proved to be 1.5–2 mm.

In order to prevent the formation of oxides and mill scales upon heating a blank with a wide groove to forging temperature, it is coated with a ceramic material or graphite. For this purpose it is advantageous if each blank prior to the application is heated to a maximum of 200° C. This provides better adhesion between the blank and the ceramic material than if the application were performed at room temperature. The material can comprise glazes of varying grain size and varying melting point. A feldspar glaze with a certain predetermined grain size has been shown in tests to function well for this purpose. The material can be applied in the groove with the aid of a nozzle achieving complete coverage of all of the surfaces of the groove.

Figure 2:
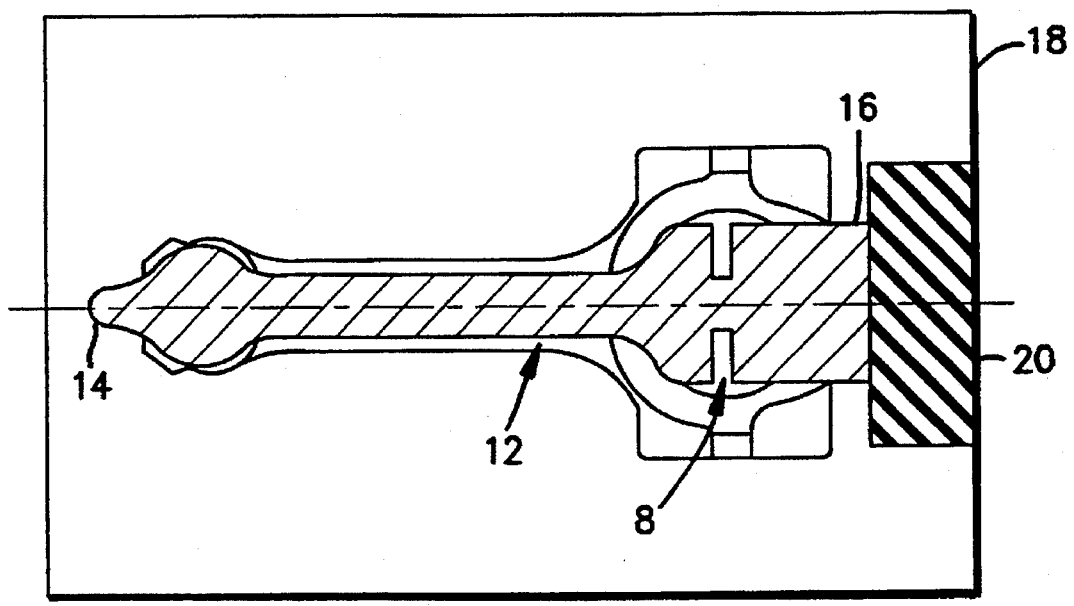
FIG. 2 shows a plan view of a preformed blank.

The blanks are then charged in a furnace in such a manner that the groove is always turned in the same direction and is heated inductively to a forging temperature in the interval 1250°–1280° C. After heating, the blanks are preformed in the conventional manner by means of stretch rolling, to obtain a blank 12 suitable for forging. The blank comprises a rolled portion 14 and an unrolled portion 16. The annular groove is located on the unrolled portion of the blank and is therefore not affected in any way by the preforming (FIG. 2). This preforming reduces the cross-sectional area and extends the length of the blank portion 14.

The subsequent forging is carried out in two steps in a thousand ton-crankshaft press, viz a preforming step and a final forming step. For preforming, the pre-rolled blank is placed in the preforming die 18, with the unrolled portion abutting against an abutment 20 in the preforming die, thus assuring that the annular groove will always be placed at exactly the same location in the preforming die (FIG. 2). This first forging step in the preforming die 18 gives the blank the correct profile.

Figure 3:
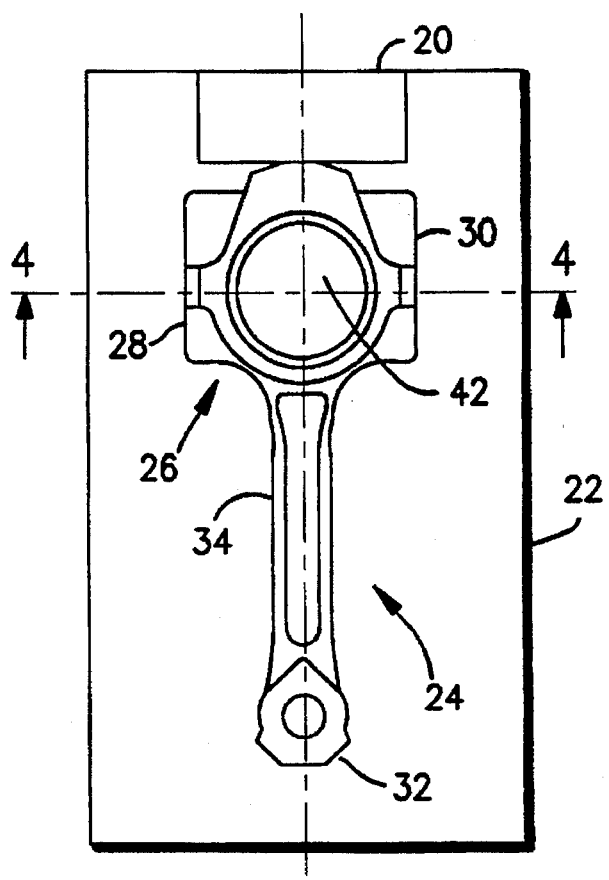
FIG. 3 shows a finishing die with a finally forged blank in plan view.
Figure 4:
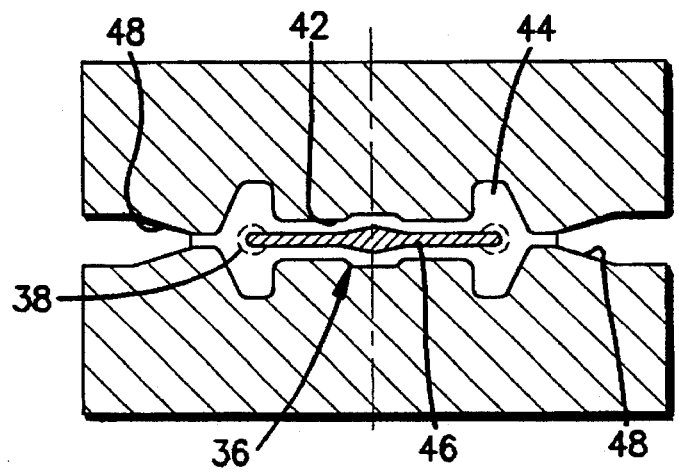
FIG. 4 shows the finishing die with the finally forged blank according to FIG. 3, in section along the line A—A.

In the second forging step, which is carried out in the finishing die 22, the connecting rod 24 is finally formed, so that it has a big-end 26 comprising an upper bearing 28, a bearing cap 30, a small-end 32 and a connecting rod arm 34, which connects the big-end to the small-end (FIG. 3). The various working steps finally impart to the connecting rod such a section that the core portion 10 along a dividing plane 36, essentially moves out to the center of each of the areas 38, through which bolt holes 40 are to be drilled in the upper bearing and the bearing cap (FIG. 4). The core material can be allowed to be spread past the center of the bolt holes but may not continue past the outer edge of each bolt hole in order not to impede the subsequent division of the connecting rod. Controlled spreading of the material is made possible by virtue of the fact that the diameter d of the core portion 10 is balanced relative to a spew area 42 located in the center of the forging die. If the ratio between the diameter d of the core portion and the size of the spew area 42 is correctly chosen, some of the core portion will always be spread out into the area 38 for the bolt holes. An optionally selected ratio will mean that each bolt hole area will be partially filled by the material of the core portion. This means that when the connecting rod is finally forged, it will have a fracture indication 44 surrounding the remaining portion 46 of the core portion.

After forging, the connecting rod is deflashed in a conventional manner both inside and outside in a crankshaft press. The deflashing is done in a heated state, directly after the final forging, to remove the material which has penetrated into the interior spew area 42 or the exterior spew area 48.

Figure 5:
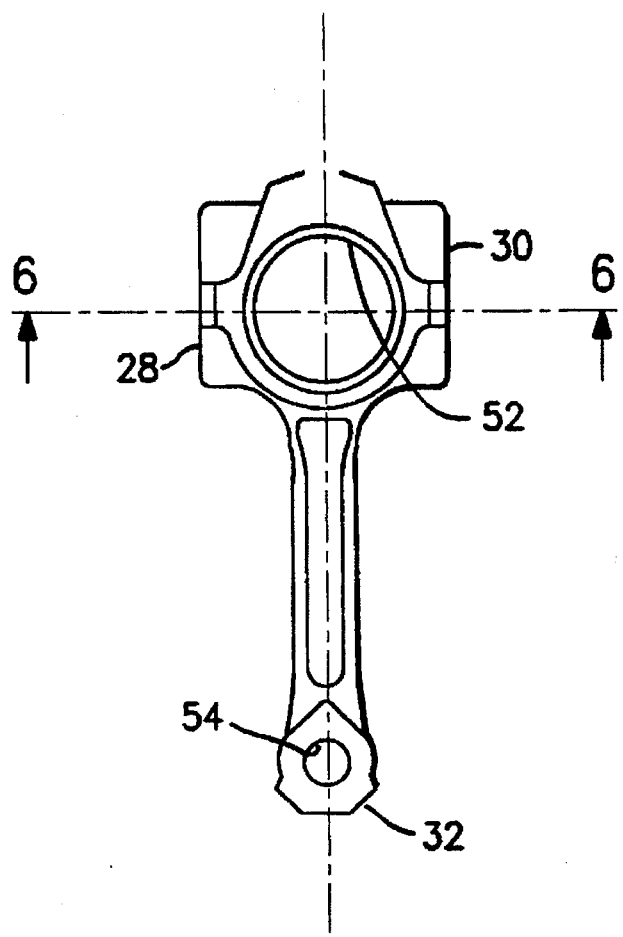
FIG. 5 shows a plan view of a finished connecting rod.
Figure 6:
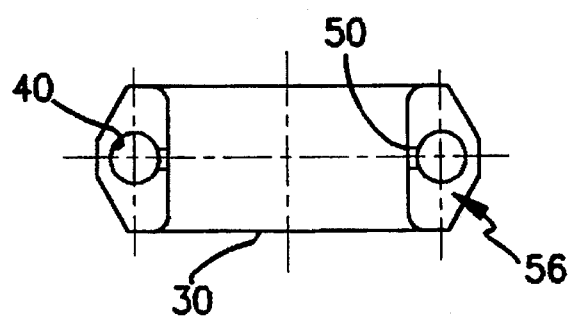
FIG. 6 shows a cross-section along the line 6—6 of the connecting rod in FIG. 5.

The next operation comprises heat calibration of certain surfaces of the connecting rod, e.g. the surfaces around the crankshaft hole 52 and the surfaces around the gudgeon pin hole 54. The calibration is done in a heated state in the same press as the deflashing and directly after said operation. After sand-blasting, the connecting rods are inspected optically, before they are subjected to a final machining. The bolt holes 40 are then drilled through the respective area 38 (FIG. 6). The deflashing and drilling operations have then removed the major portion of the remainder 46 of the core portion. What remains of the original core portion 10 is then remnants 50 remaining adjacent the bolt holes 40, which remnants 50 have not been affected by the deflashing and drilling operations. The connecting rod is thus now ready for division in the production line and is as shown in FIGS. 5 and 6. Each connecting rod is separated along the dividing plane 6—6 by a slight separating force, thus providing a guide between the upper bearing and the bearing cap by surfaces from the coated groove 56 enclosed by the forging. Only the small portion 50 needs to be pulled apart.

The invention simplifies or eliminates the following operations in the manufacture of connecting rods:

The crankshaft hole 52 is forged directly in one step with a circular shape and not in two steps as is the conventional method, i.e. first forging a connecting rod with an oval hole. Draw reaming of bearing caps is unnecessary, since the new dividing area has an exact fit in the x-, y- and z-dimensions. Sawing apart is superfluous since the division is achieved primarily by drilling bolt holes. Deep grinding in the form of serration grinding can be eliminated, since a natural fracture surface is used, for exact localization between the upper bearing and the bearing cap.

We claim:

1. In a method of manufacturing connecting rods forged in one piece, each rod having a big-end, comprising an upper bearing and a bearing cap, and a small-end, said big and small ends being joined to each other by a connecting rod arm, said method comprising: cutting, from a bar, blanks of a cross-sectional area and length appropriate to each said one-piece connecting rod; preheating the blanks, forging out each blank and dividing the connecting rod forged in one piece into two parts along a predetermined dividing plane through the big-end of the connecting rod the improvement comprising initiating the division of the finished connecting rod (24) before the beginning of the forging operations by making a groove (8) by cutting into the lateral surfaces of each blank (2), the groove (8) being disposed at a predetermined distance (L̇o) from the end of the blank which is to form the big-end (26), and having a predetermined shape, coating the groove (8) in each blank (2) with a substance which prevents formation of oxides and mill scales before the blanks are heated to forging temperature, and causing the groove (8), during the various forging steps, to expand in a predetermined manner to finally form, in the dividing plane (36), a fracture initiation (44) about a remaining homogenous portion (10, 46) of the big-end, which is located in the area (38) within which bolt holes (40) for the fastening bolts of the bearing cap (30) are present.

2. Method of manufacturing connecting rods according to claim 1, wherein the groove (8) is made radial and annular in the lateral surface of the blank (2).

3. Method of manufacturing connecting rods according to claim 1 wherein the groove (8) is essentially normal to the longitudinal axis of the blank.

4. Method of manufacturing connecting rods according to claim 1 wherein the bearing cap (30) is separated from the upper bearing (28) by the bolt holes (40) required for remounting of the bearing cap on the upper bearing, being drilled through at least the major portion of the homogeneous portion (46) surrounded by the fracture initiation (44), whereupon any remaining material (50) in the dividing plane is broken off by a slight separating force.

5. Method of manufacturing connecting rods according to claim 4, wherein the area of the remaining material (50) of the homogeneous portion (46) is less than 5% of the dividing area between the upper bearing (28) and the bearing cap (30).

6. Method of manufacturing connecting rods according to one of more of the preceding claims, wherein the substance consists of a ceramic material.

7. Method of manufacturing connecting rods according to claim 6, wherein the ceramic material is feldspar glaze.

8. Method of manufacturing connecting rods according to claim 1, wherein the substance consists of carbon black.

9. Method of manufacturing connecting rods according to claim 1, wherein the substance consists of graphite.

* * * * *